Patented Feb. 10, 1953

2,628,225

UNITED STATES PATENT OFFICE 2,628,225

POLYMERIZATION OF METHACRYLATE ESTERS WITH BENZOYL PEROXIDE-BENZOIN-FERRIC LAURATE CATALYST

Thomas Stanford Tutwiler, Elizabeth, N. J., assignor to Standard Oil Development Company, a corporation of Delaware No Drawing. Application December 10, 1949, Serial No. 132,415

2 Claims. (Cl. 260—89.5)

This invention relates to the polymerization of unsaturated materials and more particularly to the polymerization of unsaturated materials to form polymers and copolymers useful as lubricating oil additives. The invention also relates to an improved polymerization technique utilizing reducing-oxidizing catalyst systems.

It is known in the art that valuable lubricating oil additives such as materials added to lubricating oils to improve their viscosity-temperature relationship, their cold flow characteristics, and the like, may be made by polymerizing unsaturated materials. Although different types of polymerization reactions are suitable in the production of polymers and copolymers that are useful additives for lubricating oils, the polymerization techniques employing a peroxide type catalyst are especially useful.

In recent years efforts have been made to increase the reaction rate of peroxide-initiated polymerizations to increase plant capacity or, in certain cases, to obtain improved products by lower temperature polymerization. The obvious use of more peroxide, or of peroxides having lower thermal stability, to accomplish this is generally unsatisfactory for economic and product quality considerations. The emulsion polymerization technique, that is, one in which the monomer is emulsified with water by means of an emulsifying agent, such as a soap, and a water soluble catalyst is usually employed, has been a significant improvement in the polymerization art because it usually gives rates of polymerization as much as ten-fold faster than a similar bulk or homogeneous system in which the monomer is polymerized by adding a suitable catalyst directly thereto, or the monomer is completely dissolved in a solvent and the catalyst is added to this homogeneous system, called "solution polymerization." However, emulsion polymerization techniques are not usually as well suited to the production of lubricating oil additives as solution polymerization methods.

The most important recent development in the field of peroxide type polymerization technique has been the combining of a reducing agent and a trace of a soluble metal salt, such as an iron salt, with the peroxide type catalyst normally used. Such a combination is generally referred to as a reduction-activation system. Workers in the field of polymerization techniques have used the term "Redox," borrowed from the similar oxidation-reduction biological systems, to characterize this combination of a reducing agent and an oxidizing agent for initiating polymerization. In the case of the relatively simple ferrous ion-hydrogen peroxide system for water solution polymerization, free radicals are generated for initiating polymerization by a simple electron transfer reaction which may be represented by the following:

$$H_2O_2 + Fe^{++} \rightarrow HO + OH^- + Fe^{+++}$$

A reducing agent is usually employed to convert the ferric ion back to the ferrous ion. An advantage of the "Redox" system is that fast rates of polymerization can be obtained with peroxides of high thermal stability when using solution polymerization techniques. Various peroxides and "per" salts which are widely used in polymerization work, such as hydrogen peroxide, benzoyl peroxide, cumene hydroperoxide, potassium-persulfate, lauroyl peroxide, ammonium persulfate, urea hydroperoxide, t-butyl hydroperoxide, t-butyl perbenzoate, etc., may successfully be used in "Redox" systems.

The preferred peroxide for the operation of this invention is benzoyl peroxide, which is usually employed in concentrations ranging from 0.2% to 3.0%, based on weight of monomer. Benzoin is a valuable reducing agent for use in "Redox" systems such as are employed in this invention, and benzoin concentrations of 0.1% to 1.5% based on weight of monomer are usually preferred. Soluble metallic salts such as the iron salts of lauric acid, cocoanut acids and tallow fatty acids are excellent activators for "Redox" polymerization systems and are generally employed in concentrations of 0.005% to 0.10% based on the monomer weight.

The "Redox" type polymerization of unsaturated compounds is especially suitable for the preparation of lubricating oil additives, particularly viscosity index improvers and pour point depressants. These materials when added to a lubricating oil decrease the rate of change of viscosity with temperature, in other words, improve the "viscosity index" of the blend, or lower the temperature at which the oil ceases to be fluid.

Monomers polymerizable by "Redox" techniques which are of particular interest in this invention include esters of alpha, beta unsaturated monobasic and dibasic acids, such as acrylic, methacrylic, crotonic, alpha chlorcrotonic, maleic, fumaric, itaconic acids, etc., and mixtures thereof. Various alcohols may be employed in forming the esters of the above acids, including primary and secondary, normal and branched chain alcohols. Mixtures of alcohols can of course be employed. Specific alcohols which may be mentioned as suitable are methyl, ethyl, octyl, decyl, dodecyl, cetyl, stearyl, as well as commercial mixtures derived from cocoanut oil, and Oxo alcohols, that is, alcohols prepared by the Oxo synthesis process in which monoolefins are catalytically reacted with carbon monoxide and hydrogen at 300–400° F. and under high pressures such as 1000–3000 p. s. i. g. to form aldehydes which are then hydrogenated to primary alcohols. It is also possible to employ alcohols containing such groups as —$NH_2$, halogen, —$NO_2$, —OH, —OR, etc. The alcohols which are employed may have from 1 to 22 carbon atoms, although the alcohols, or mixtures of alcohols, should have an average of at least 7 carbon atoms in order to provide oil solubility to the polymer product. In general, averages of $C_7$ to $C_{12}$ are preferred for V. I. improvers and averages of $C_{11}$ to $C_{14}$ are preferred for pour depressants.

It will be understood that this invention is not limited to simple polymerization, but is applicable also to copolymerization wherein a number of different monomers are employed. For example, mixtures of acrylates and methacrylates, fumarates and itaconates, methacrylates and aconitates, etc. may be polymerized by this process. In the preparation of lubricating oil additives it is often desirable to prepare the product as a concentrate in an oil base similar to that in which it will be ultimately employed. For this reason, this invention is particularly concerned with, but not limited to, oil solution polymerization.

One disadvantage of the peroxide polymerization technique when employing a reduction-activation system is that the polymeric or copolymeric materials resulting are prone to increase in molecular weight upon long standing. It is obvious that this disadvantage may become quite serious since the increased molecular weight of the additive material of necessity increases the viscosity of the oil blend which is prepared with it. It is believed that this increase in molecular weight of the polymerization product is due to the ability of a "Redox" catalyst to continue the polymerization at unusually low temperatures, for example 20° C. or lower.

In laboratory polymerizations of materials such as acrylate or methacrylate esters, for instance, it has been found difficult to stop the reaction at the desired average molecular weight level when employing a reduction-activation system by simply lowering the reaction temperature. Even the use of polymerization inhibitors such as hydroquinone, propionaldehyde, air and etc. has not been uniformly successful in preventing the polymeric product from increasing in molecular weight on standing at room temperature.

The present invention is directed toward a method for carrying out these promoted peroxide type polymerization reactions in such a manner as to prevent any subsequent increase in molecular weight thereby insuring a product of substantially constant molecular weight.

Briefly stated, the invention involves conducting the polymerization reaction in two temperature stages. The first of these stages is carried out at a relatively low temperature until the reaction is substantially completed, and the second stage is carried out at a higher temperature, generally for a relatively short period of time.

As is well understood in the art, the normal polymerization temperature will vary with the constituents of the polymerizable mixture and with the molecular weight desired. Generally speaking, molecular weight of the polymer product increases as the reaction temperature decreases, the converse being true, within certain limits. In the instant invention, the first stage of the polymerization reaction is carried out at a temperature which will produce a polymer of the desired molecular weight. Suitable temperatures are in the range of from about 10° to about 75° C., preferably from 25° to 60° C. The polymerization reaction is carried on in the first stage until substantially all of the polymerizable constituents are used up. The exact time will depend upon the constituents used and the temperature of reaction. The time may vary from 1 to 100 hours, but usually is from 5 to 35 hours.

During the second or final stage of the polymerization, the temperature is quite suddenly increased to far above the normal polymerizing temperature. This second stage temperature may vary from 10° C. to 75° C. higher than the temperature maintained during the first stage of the polymerization reaction. In any event, in those cases wherein a peroxide type catalyst is used, this final stage temperature should be in the range of from about 85° C. to about 150° C. a preferred range being from about 95° C. to about 120° C. The reaction is held at this temperature until the polymerization is completed. At this higher temperature the polymerization product formed will have a molecular weight somewhat lower than that produced in the first stage of the reaction, as was explained above. However, a relatively small amount of polymer, generally less than 10%, is involved, so that the average molecular weight of the total polymer is in the desired range. It will be appreciated that the product obtained by this method has a more uniform molecular weight than either a product containing unpolymerized residual monomers or a product in which the residual monomers have continued to polymerize to an extremely high molecular weight on storage.

Although the exact mechanism by which this improved process operates is not known, it is believed that the high temperature maintained during the second stage of the polymerization speeds up the polymerization reaction to such a rate that the total remaining catalyst and the remaining monomers in the mixture are used up within a very short period of time, whereas normally the catalyst would not become completely inactive until the lapse of a much greater time even though inhibitor materials were added.

The data and examples given below are illustrative of the improved polymerization process of this invention.

*Example 1*

A mixture of approximately 80% $C_8$ Oxo methacrylate[1] 1—an ester of methacrylic acid and a C–8 Oxo alcohol with approximately 20% Lorol B methacrylate[1] was copolymerized in 35% concentration in a solvent extracted Mid-Continent lubricating oil (oil A) having a 43 S. U. S. viscosity at 210° F. using "Redox" promoted benzoyl peroxide catalyst (0.5% benzoin, 0.03% ferric laurate, 1.5% benzoyl peroxide, based on monomers). The reaction was carried out at 50° C. for 25 hours, then the temperature was raised to 110° C. for 1 hour after which the reaction was considered finished.

A 3.6 wt. percent active ingredient blend of the newly prepared copolymer in a lubricating oil base stock of the solvent extracted Mid-Continent type having a viscosity at 210° F. of 45.7 S. U. S. (oil B) was prepared and the blend was found to have a viscosity at 210° F. of 64.7 S. U. S. The 35% copolymer concentrate was stored for 2 weeks at 60° C. after which another 3.6 wt. percent copolymer blend in oil B was prepared. The blend viscosity at 210° F. was 64.7 S. U. S., indicating no change in copolymer molecular weight during storage.

*Example 2*

A copolymer of C8 Oxo methacrylate-Lorol B methacrylate was prepared in a similar fashion to Example 1 except that the reaction was completed at the normal reaction temperature, in this case 60° C. The 3.6 wt. percent blend of the newly prepared copolymer in oil B had a viscosity at 210° F. of 65.6 S. U. S. A similar blend prepared from 35% copolymer concentrate stored for 2 weeks at 60° C. had a viscosity at 210° F. of 77.1 S. U. S. 1—an ester of methacrylic acid and a mixture of alcohols obtained by hydrogenating cocoanut oil, said mixture having an average carbon chain length of 13.2 indicating that the copolymer had increased considerably in molecular weight during storage.

*Example 3*

A copolymer of C8 Oxo methacrylate-Lorol B methacrylate was prepared in a similar fashion to Example 1 at a reaction temperature of 40–60° C. After 25 hours the copolymer was divided into two parts. Part I was finished at the normal reaction temperature of 60° C. Part II was finished at 100° C. for 1 hour. Storage stability summary data are shown below.

| | 3.6 Wt. Percent Copolymer Blends in Oil B (Viscosity 210° F./S. U. S.) | |
|---|---|---|
| | Newly Prepared Copolymer | Copolymer Concentrate Stored 2 weeks @ 60° C. |
| Part I | 80.2 | 82.1 |
| Part II | 80.9 | 80.9 |

It will be noted that Part II, which was finished at a high temperature, showed better storage stability than Part I which was finished at the normal reaction temperature.

In summation, this invention comprises an improved polymerization technique wherein the polymerization reaction is carried out in two temperature stages, the first stage using a temperature suitable for the production of the desired molecular weight range product and the second stage using a temperature from 10° to 75° C. higher than that employed in the first stage. This improved technique results in a polymerizate which has no tendency to increase in molecular weight on standing, and a more uniform molecular weight distribution than the products of the prior art.

What is claimed is:

1. In a process for the polymerization of methacrylate esters wherein from 0.2% to 3.0% of benzoyl peroxide is promoted with from 0.1% to 1.5% benzoin and from 0.005% to 0.1% of ferric laurate, the improvement which comprises maintaining the reaction temperature at one within a range of from 25° to 75° C. for from 5 to 35 hours, thereafter raising the reaction temperature to one within a range of from 95° to 110° C. for one hour, and obtaining therefrom a product which does not increase in molecular weight on continued standing.

2. In a process for the polymerization of methacrylate esters wherein 1.5% benzoyl peroxide catalyst is promoted with 0.5% benzoin and 0.03% ferric laurate, the improvement which comprises maintaining the reaction temperature at 50° C. for 25 hours and thereafter raising the temperature to 110° C. for one hour, obtaining therefrom a product which does not increase in molecular weight on continued standing.

T. STANFORD TUTWILER.

REFERENCES CITED

The following references are of record in the file of this patent:

UNITED STATES PATENTS

| Number | Name | Date |
|---|---|---|
| 2,171,765 | Rohm | Sept. 5, 1939 |
| 2,273,891 | Pollack | Feb. 24, 1942 |
| 2,404,268 | Barnes | July 16, 1946 |
| 2,413,973 | Howk et al. | Jan. 7, 1947 |
| 2,456,558 | Glick | Dec. 14, 1948 |
| 2,473,708 | Hayes | June 21, 1949 |
| 2,473,929 | Wilson | June 21, 1949 |
| 2,508,341 | Wilson | May 16, 1950 |
| 2,515,686 | Barnes | July 18, 1950 |